July 28, 1925.

H. W. WEAVER

GASOLINE FILTER

Filed May 3, 1924

Henry W. Weaver
INVENTOR

BY Victor J. Evans
ATTORNEY

WITNESS:

Patented July 28, 1925.

1,547,246

UNITED STATES PATENT OFFICE.

HENRY W. WEAVER, OF HOLLYWOOD, CALIFORNIA.

GASOLINE FILTER.

Application filed May 3, 1924. Serial No. 710,864.

*To all whom it may concern:*

Be it known that I, HENRY W. WEAVER, a citizen of the United States, residing at Hollywood, in the county of Los Angeles and State of California, have invented new and useful Improvements in Gasoline Filters, of which the following is a specification.

This invention relates to gasoline filters for automobiles and the like and its object is to provide a filter through which gasoline may be filtered in larger quantities, and with great rapidity, and with little impediment or obstruction.

The invention further provides for a gasoline filter in which the gasoline, while being drawn into an inner filter will be sufficiently retarded in its passage by reason of the filter being filled always to capacity, that the dirt or sediment will settle to the bottom, and the gasoline will pass upward, over, and through the top of the filtering chamber, thus preparing a greater supply of filtered gasoline, and preventing the clogging of the filtering device for a longer period of time than is possible with any other filter at the present time.

A further object of the invention is to provide a gasoline filter in which the gasoline, after passing through the inner filter for the filtering of its gross dirt, enters a second or outer filter in which the water contained in the gasoline is filtered more quickly and more efficiently than is possible with filters now in use on automobiles.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 4 is a top plan view of the inner filter.

Figure 1:
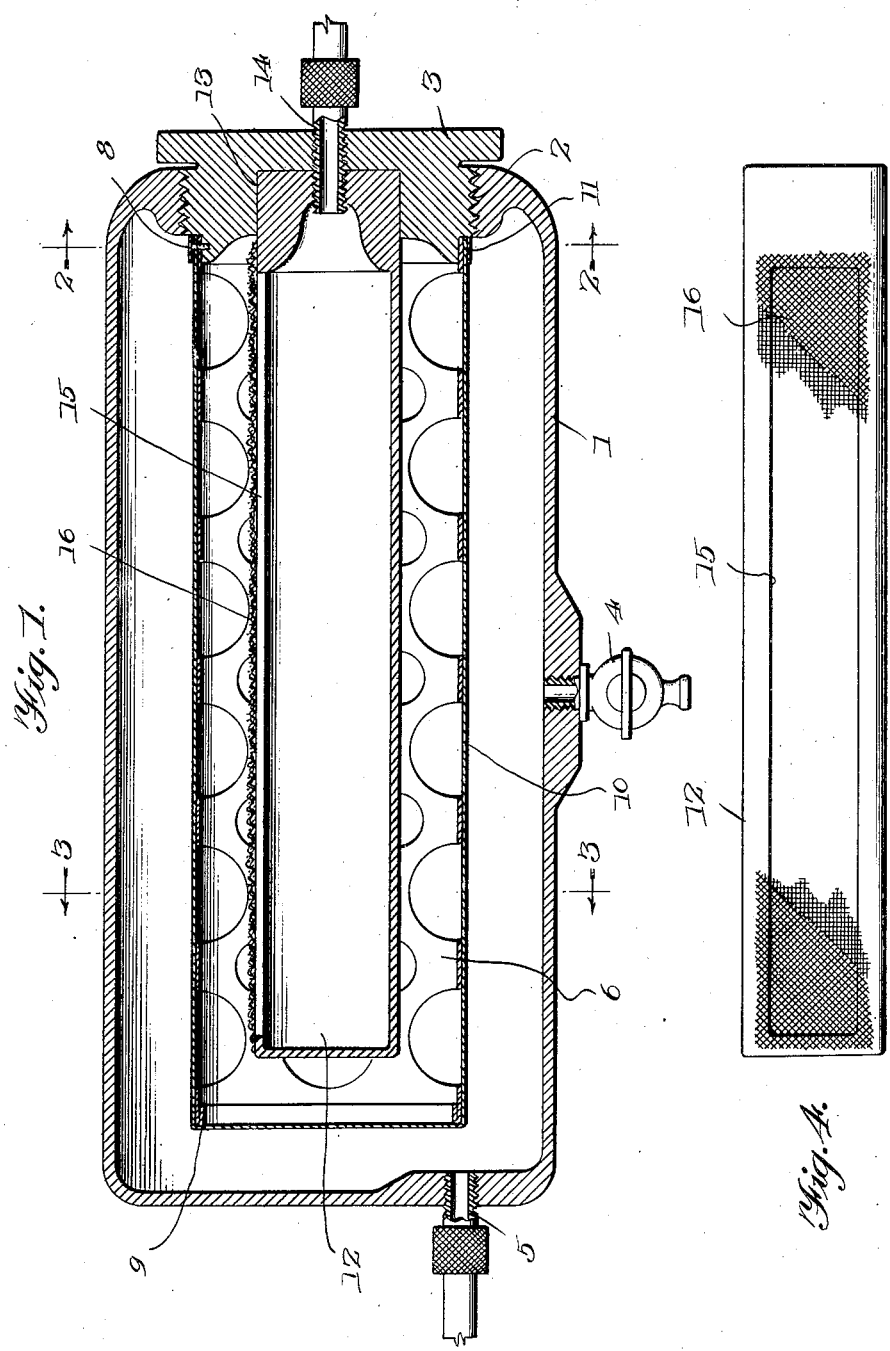
Figure 1 is a longitudinal sectional view through the device.
Figure 2:
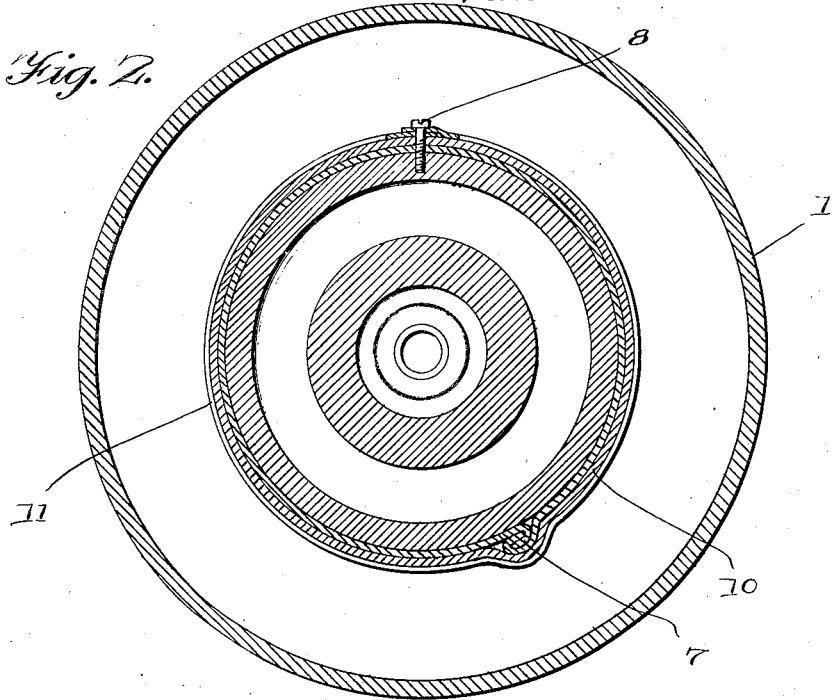
Figure 2 is a section on line 2—2 of Figure 1.
Figure 3:
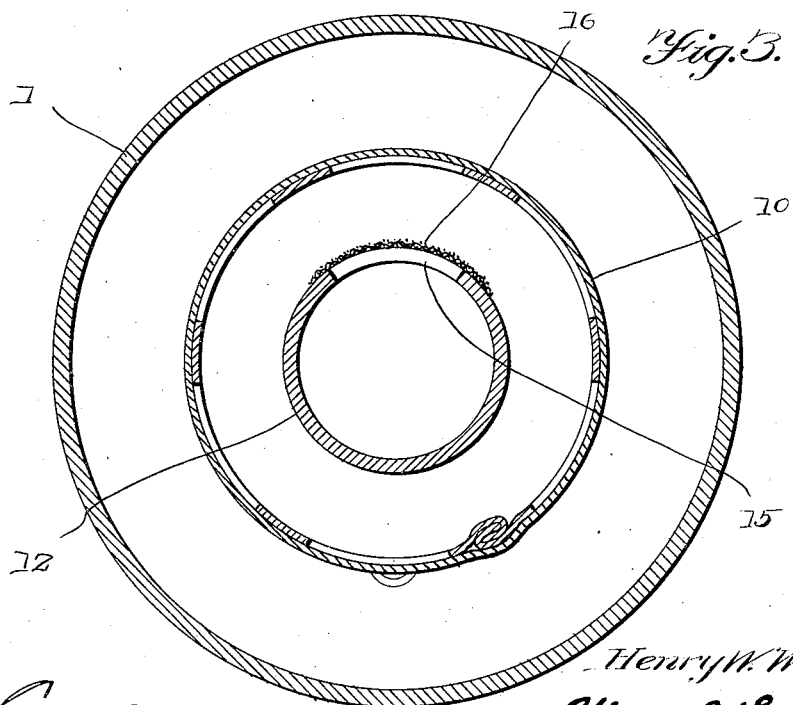
Figure 3 is a section on line 3—3 of Figure 1.
Figure 5:
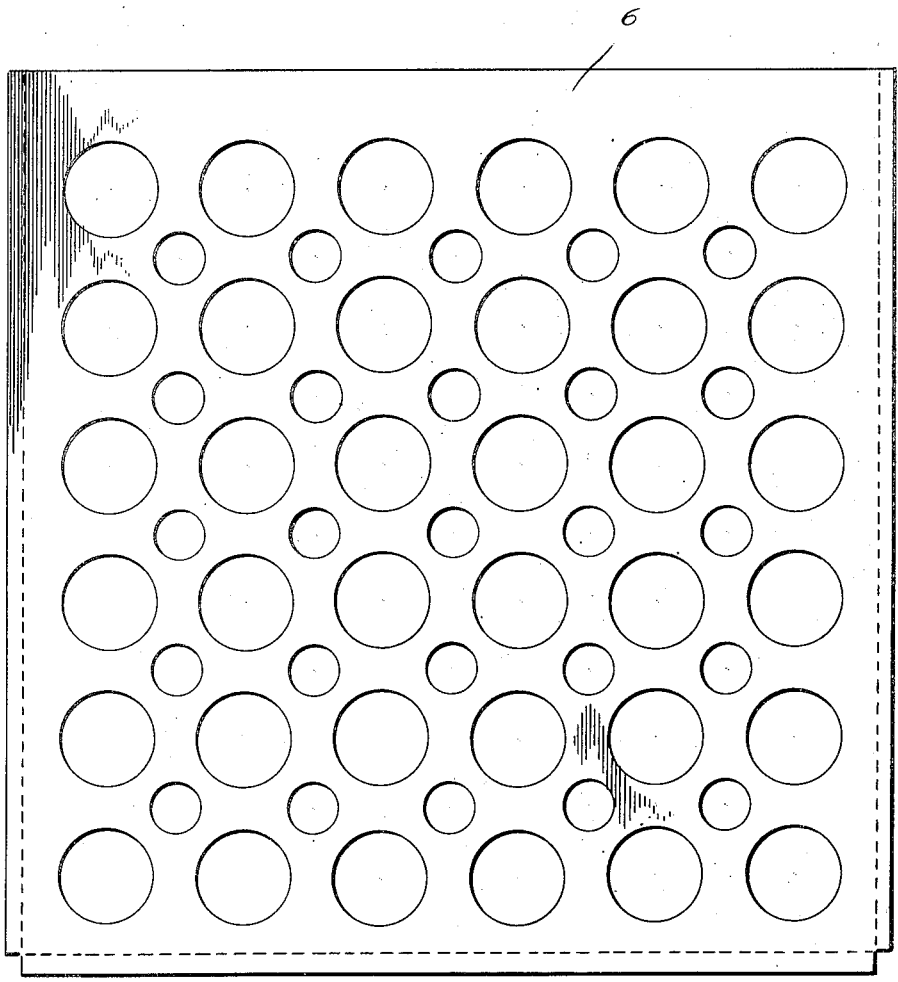
Figure 5 is a view of the perforated plate forming part of the outer filter.

In these views, 1 indicates the cylinder which has one end closed and its other end provided with an opening having screw threaded walls 2, for receiving the threaded part of a casting 3 which closes the opening. The central lower portion of the cylinder is reinforced and has a threaded hole therein to receive the drain cock 4 and the lower portion of the closed end is also reinforced and provided with a threaded hole to receive the outlet pipe 5. A perforated plate 6 is rolled to form a cylinder with its ends rolled together, as shown at 7, and one end of this cylinder is fastened to the reduced inner end of the casting 3 by the screws 8. The opposite end of the cylinder, formed by the plate 6, is open with the metal upset, as shown at 9. A covering 10 of chamois skin or the like is placed over the perforated cylinder and is held thereon by means of the ring 11 which is held in place by the screws 8. This cover extends over the open end of the perforated cylinder and by having the outer end of the cylinder upset, as shown at 9, there is no danger of the cylinder cutting the cover. The perforations in the plate 6 are arranged in rows with alternate rows of much greater diameter than the other rows as clearly shown in Figure 5. A small cylinder 12 has one end snugly fitting in a recess 13 formed in the casting 3 and the cylinder is held in position by the threaded inlet pipe 14 which engages threaded holes in the casting and the cylinder. This cylinder extends within the perforated cylinder 6 and is entirely closed except for an elongated opening 15 formed in the top part thereof and this opening is covered by the gauze 16 which is rounded, as shown.

The gasoline or other liquid to be strained will pass into the inner filter formed by the cylinder 12 through the inlet pipe 14 and after filling this cylinder will flow through the opening 15, through the metal gauze covering the same into the outer filter formed by the perforated cylinder 6 and the chamois 10. The gasoline after passing through the outer filter will fill the cylinder 1 and will pass through the outlet 5.

I prefer to fasten this filter, by bands or the like, to the exhaust manifold of a motor and to attach the outlet 5 to the carbureter so that the gasoline will be heated before reaching the carbureter.

The inner filter will retard the gasoline sufficiently to cause any dirt or sediment therein to settle to the bottom of the cylinder 12 and thus prevent the sediment from entering the outer filter. This will prevent clogging of the filtering device for a long time and it will pass into the outer filter practically free of dirt and this outer filter will filter the water from the gasoline. By placing the outlet 5, as shown, the weight of practically the entire capacity of the tank will act upon the gasoline passing through the outlet. By forming the cylinder 6 as shown there are no sharp edges to cut the chamois and by forming the perforations in said cylinder 6, as shown, the gasoline will pass through the cylinder without delay or obstruction. By rounding the metal gauze 16 to the same radius as the walls of the cylinder 12 the maximum space for the passage of liquid from the cylinder 12 is provided.

The parts can be easily separated for cleaning purposes and the device is so simple that it can be manufactured to sell at low cost.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A filter of the class described comprising an outer cylinder, a cap for closing one end of the same, a perforated cylinder connected with the cap and having its other end open, a filtering cloth covering the perforated cylinder and its open end, a second cylinder carried by the cap and extending within the perforated cylinder, said second cylinder having an opening in its upper part, gauze covering the opening, means for introducing the material to be filtered into the second cylinder and outlet means connected with the main cylinder.

2. A filter of the class described comprising an outer cylinder, a screw cap for closing one end thereof, a perforated cylinder having one end connected with the inner part of the cap and its other end open, the perforations in said cylinder being arranged in rows with alternate rows having their perforations of greater diameter than the perforations in the other rows, a filtering cloth covering the cylinder and extending over its open end, a second cylinder within the perforated cylinder, means for attaching said second cylinder to the cap, said second cylinder having an elongated opening in its upper part, a curved screen of metal gauze covering said opening, outlet means connected with the outer cylinder and means for introducing the liquid to be filtered into the second cylinder.

3. A filter comprising an outer cylinder, a discharge pipe connected with the same, a screw cap closing one end of the cylinder and provided with a recess, an outer filter member carried by the inner portion of the cap, an inner filter member having a portion engaging the recess in the cap and an inlet pipe threaded to the cap and one end of the inner member for holding said inner member to the cap.

In testimony whereof I affix my signature.

HENRY W. WEAVER.